US012750152B2

(12) United States Patent
Wang et al.

(10) Patent No.: US 12,750,152 B2
(45) Date of Patent: Sep. 29, 2026

(54) OPTICAL FIBER TEST METHOD, ROADM SYSTEM, SERVER AND STORAGE MEDIUM

(71) Applicant: ZTE Corporation, Shenzhen (CN)

(72) Inventors: Zhen Wang, Shenzhen (CN); Mingchao Zhang, Shenzhen (CN); Yongdong Guo, Shenzhen (CN); Xiaoyu Zhu, Shenzhen (CN); Zhiyong Zhao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 165 days.

(21) Appl. No.: 18/614,591

(22) Filed: Mar. 22, 2024

(65) Prior Publication Data

US 2024/0235717 A1 Jul. 11, 2024

Related U.S. Application Data

(63) Continuation of application No. PCT/CN2022/121278, filed on Sep. 26, 2022.

(30) Foreign Application Priority Data

Sep. 26, 2021 (CN) .......................... 202111131784.8

(51) Int. Cl.
*H04B 10/00* (2013.01)
*H04J 14/02* (2006.01)
(Continued)

(52) U.S. Cl.
CPC ...... *H04J 14/0212* (2013.01); *H04J 14/0307* (2023.08); *H04Q 11/0005* (2013.01); (Continued)

(58) Field of Classification Search
CPC ... H04Q 2011/0052; H04Q 2011/0073; H04Q 2011/0079; H04Q 2011/0083; (Continued)

(56) References Cited

U.S. PATENT DOCUMENTS 8,699,354 B2 4/2014 Patel et al.
8,891,965 B2 11/2014 Fuerst et al.
(Continued)

FOREIGN PATENT DOCUMENTS

CN 101387877 A 3/2009
CN 102546009 A 7/2012
(Continued)

OTHER PUBLICATIONS

European Search Report issued in EP Patent Application No. 22872196.5, dated Dec. 3, 2024, 15 pages.
(Continued)

*Primary Examiner* — Daniel G Dobson
(74) *Attorney, Agent, or Firm* — Perkins Coie LLP

(57) ABSTRACT

The disclosure relates to the technical field of optical fibers, and particularly relates to an optical fiber detection method, a reconfigurable optical add-drop multiplexer (ROADM) system, a server, and a storage medium. The optical fiber detection method is applied to a network management server of the ROADM system. The method includes: sequentially turning on one optical fiber according to a preset order; controlling a downlink optical amplifier corresponding to the optical fiber to provide an optical signal; obtaining first optical power output by the downlink optical amplifier corresponding to the optical fiber and second optical power input to an uplink optical amplifier corresponding to the optical fiber; and obtaining a connection state of the optical fiber based on a pre-stored first insertion loss value of a downlink wavelength selective switch (WSS) corresponding to the optical fiber, a pre-stored second insertion loss value of an uplink WSS corresponding to the optical fiber, the first optical power, and the second optical power. In an entire testing process, corresponding optical fibers only need to be sequentially turned on according to the preset order, such
(Continued)

that a lot of manpower, material resources and time cost are reduced, interference of human factors in test results is basically avoided, and reliability is greatly improved.

14 Claims, 8 Drawing Sheets

(51) Int. Cl.
*H04Q 11/00* (2006.01)
*H04J 14/00* (2006.01)

(52) U.S. Cl.
CPC ................ *H04Q 2011/0039* (2013.01); *H04Q 2011/0049* (2013.01)

(58) Field of Classification Search
CPC .... H04J 14/021; H04J 14/0217; H04J 14/022; H04B 10/07; H04B 10/0773; H04B 10/0793
See application file for complete search history.

(56) References Cited

U.S. PATENT DOCUMENTS

| | | | |
|---|---|---|---|
| 9,528,907 | B2 | 12/2016 | Cheng et al. |
| 9,680,569 | B2 | 6/2017 | Archambault et al. |
| 10,666,377 | B2 | 5/2020 | Yu et al. |
| 2010/0097601 | A1 | 4/2010 | Bato et al. |
| 2017/0230110 | A1 | 8/2017 | Hurley et al. |
| 2018/0295430 | A1* | 10/2018 | Younce ............. H04J 14/02126 |
| 2020/0092027 | A1* | 3/2020 | Yu ....................... H04J 14/0205 |
| 2021/0288743 | A1* | 9/2021 | Grammel ........... H04Q 11/0066 |

FOREIGN PATENT DOCUMENTS

| | | | |
|---|---|---|---|
| CN | 103856258 | A | 6/2014 |
| CN | 106209295 | A | 12/2016 |
| CN | 109088777 | A | 12/2018 |
| EP | 3624369 | A1 | 3/2020 |
| JP | 2016208493 | A | 12/2016 |
| JP | 2020048177 | A | 3/2020 |
| WO | 2013183146 | A1 | 12/2013 |
| WO | 2020217439 | A1 | 10/2020 |

OTHER PUBLICATIONS

Japanese office action issued in JP Patent Application No. 2024-518740, dated May 13, 2025, 8 pages. English translation included.
International Search Report and Written Opinion for International Application No. PCT/CN2022/121278, mailed on Dec. 22, 2022, 8 pages with English translation.
Indian Examination Report issued in IN Patent Application No. 202417029696, dated Jan. 30, 2026, 13 pages.

* cited by examiner

OPTICAL FIBER TEST METHOD, ROADM SYSTEM, SERVER AND STORAGE MEDIUM

CROSS-REFERENCE TO RELATED APPLICATIONS

This application is a continuation of International Patent Application No. PCT/CN2022/121278, filed on Sep. 26, 2022, which claims priority to Chinese patent application Ser. No. 202111131784.8, filed on Sep. 26, 2021. The entire contents of the before-mentioned patent applications are incorporated by reference as part of the disclosure of this application.

TECHNICAL FIELD

This disclosure relates to the technical field of optical fibers, and particularly relates to an optical fiber detection method, a reconfigurable optical add-drop multiplexer (ROADM) system, a server, and a storage medium.

BACKGROUND

A reconfigurable optical add-drop multiplexer (ROADM) is the key technology of a wavelength division multiplexing (WDM) optical network. A local uplink and downlink function and a straight-through function of a channel wavelength can be achieved in real time by configuring the ROADM with software, which enhances flexibility of wavelength scheduling in the WDM optical network. At present, an ROADM function is mainly implemented by three devices, including a wavelength blocker (WB), a planar lightwave circuit (PLC), and a wavelength selective switch (WSS). An WSS-based ROADM has been deployed and applied more widely in existing networks of operators.

In order to ensure accuracy of a connection relation of physical optical fibers of respective ports of WSS modules in ROADM nodes, power of each optical fiber link is measured with an optical power meter after project deployment is completed, that is, after a tester connects all the ports by physical optical fibers according to a service fiber connection plan, such that whether physical optical fiber connection is wrong is determined in current projects. This method requires the tester to test each optical fiber link in each ROADM node. However, the physical optical fibers in multi-dimensional RODM nodes are very complex and abundant. It takes a lot of manpower, material resources and time cost for the tester to test each optical fiber link in each ROADM node. There may be interference in test results by human factors, which influences accuracy of the test results.

SUMMARY

A main objective of embodiments of the disclosure is to provide an optical fiber detection method, a reconfigurable optical add-drop multiplexer (ROADM) system, a server, and a storage medium, so as to improve accuracy of test results while reducing manpower and time cost.

In order to achieve the objective, an embodiment of the disclosure provides an optical fiber detection method, which is applied to a network management server of an ROADM system. The ROADM system includes: the network management server and a plurality of optical fiber connection units connected to the network management server. Each of the optical fiber connection units includes: a downlink optical amplifier, a downlink wavelength selective switch (WSS), an uplink optical amplifier, and an uplink WSS. An output end of the downlink optical amplifier is connected to an input port of the downlink WSS, and the downlink WSS includes n transmission ports. An input end of the uplink optical amplifier is connected to an output port of the uplink WSS, and the uplink WSS includes n reception ports. The n transmission ports and the n reception ports of each of the optical fiber connection units are arranged in a one-to-one correspondence manner. The n transmission ports of each of the optical fiber connection units are respectively connected to a reception port of other n optical fiber connection units by optical fibers, and the n reception ports of each of the optical fiber connection units are respectively connected to a transmission port of other n optical fiber connection units by optical fibers. One of the n transmission ports of one of the optical fiber connection units is connected to one of the n reception ports of another one of the optical fiber connection units, and a reception port of the one of the n optical fiber connection units corresponding to the one of the n transmission ports is connected to a transmission port of the another one of the optical fiber connection units corresponding to the one of the n reception ports. The method includes: sequentially turning on one optical fiber according to a preset order; controlling the downlink optical amplifier corresponding to the optical fiber to provide an optical signal; obtaining first optical power output by the downlink optical amplifier corresponding to the optical fiber and second optical power input to the uplink optical amplifier corresponding to the optical fiber; and obtaining a connection state of the optical fiber based on a pre-stored first insertion loss value of the downlink WSS corresponding to the optical fiber, a pre-stored second insertion loss value of the uplink WSS corresponding to the optical fiber, the first optical power, and the second optical power.

An embodiment of the disclosure further provides an optical fiber detection method, which is applied to a network management server of an ROADM system. The ROADM system includes: the network management server and a plurality of optical fiber connection units connected to the network management server. Each of the optical fiber connection units includes: a downlink optical amplifier, a downlink WSS, an uplink optical amplifier, an uplink WSS, and a detector. An output end of the downlink optical amplifier is connected to an input port of the downlink WSS, and the downlink WSS includes n transmission ports. An input end of the uplink optical amplifier is connected to an output port of the uplink WSS, and the uplink WSS includes n reception ports. The detector is connected to the uplink optical amplifier. The n transmission ports and the n reception ports of each of the optical fiber connection units are arranged in a one-to-one correspondence manner. The n transmission ports of each of the optical fiber connection units are respectively connected to one reception ports of other n optical fiber connection units by optical fibers, and the n reception ports of each of the optical fiber connection units are respectively connected to one transmission ports of the other n optical fiber connection units by optical fibers. One of the transmission ports of one of the optical fiber connection units is connected to one of the reception ports of another one of the optical fiber connection units, and a reception port of the one of the optical fiber connection units corresponding to the one of the transmission ports is connected to a transmission port of the another one of the optical fiber connection units corresponding to the one of the reception ports. The method includes: controlling the downlink optical amplifier of each of the optical fiber connection units to provide an optical signal; controlling the plurality of transmission ports of each of the optical fiber connection units to work simultaneously, where each of the transmission ports is constantly turned on and off based on respective preset on-off time; controlling one of the reception ports of each of the optical fiber connection units to be turned on, and controlling the reception ports other than the one of the reception ports of each of the optical fiber connection units to be turned off; detecting actual on-off time of the optical signal in the uplink optical amplifier by the detector of each of the optical fiber connection units; and obtaining a connection state of the corresponding optical fiber based on the actual on-off time and the respective preset on-off time of the corresponding transmission port.

An embodiment of the disclosure further provides an ROADM system. The system includes: a network management server and a plurality of optical fiber connection units connected to the network management server. Each of the optical fiber connection units includes: a downlink optical amplifier, a downlink WSS, an uplink optical amplifier, and an uplink WSS. An output end of the downlink optical amplifier is connected to an input port of the downlink WSS, and the downlink WSS includes n transmission ports. An input end of the uplink optical amplifier is connected to an output port of the uplink WSS, and the uplink WSS includes n reception ports. The n transmission ports and the n reception ports of each of the optical fiber connection units are arranged in a one-to-one correspondence manner. The n transmission ports of each of the optical fiber connection units are respectively connected to one reception ports of the other n optical fiber connection units by optical fibers, and the n reception ports of each of the optical fiber connection units are respectively connected to one transmission ports of the other n optical fiber connection units by optical fibers. One of the transmission ports of one of the optical fiber connection units is connected to one of the reception ports of another one of the optical fiber connection units, and a reception port of the one of the optical fiber connection units corresponding to the one of the transmission ports is connected to a transmission port of the another one of the optical fiber connection units corresponding to the one of the reception ports.

An embodiment of the disclosure further provides a server. The server includes: at least one processor; and a memory communicatively connected to the at least one processor. The memory stores an instruction executable by the at least one processor. The instruction, when executed by the at least one processor, enables the at least one processor to execute the optical fiber detection method mentioned above.

An embodiment of the disclosure further provides a computer readable storage medium, which stores a computer program. The computer program, when executed by a processor, implements the optical fiber detection method mentioned above.

According to the disclosure, the optical signal is provided by the downlink optical amplifier, and first optical power information of the input end of the downlink optical amplifier and second optical power of the output end of the uplink optical amplifier are inquired by the network management server. A connection insertion loss value of a corresponding physical optical fiber may be computed based on the above information, such that whether the physical optical fiber is abnormal is detected. In an entire testing process, the network management server only needs to sequentially turn on corresponding optical fibers according to the preset order, and a tester does not need to manually conduct testing through test instruments site by site, such that a lot of manpower, material resources and time cost are reduced, interference of human factors in test results is basically avoided, and reliability is greatly improved.

BRIEF DESCRIPTION OF THE DRAWINGS

One or more embodiments are illustrated with reference to figures in corresponding drawings, which do not constitute a limitation of the embodiments. Elements having the same reference numerals in the drawings represent similar elements, and the figures in the drawings do not constitute a scale limitation unless otherwise specified.

DETAILED DESCRIPTION OF EMBODIMENTS

In order to make objectives, technical solutions and advantages of embodiments of the disclosure clearer, all the embodiments of the disclosure will be described below in detail with reference to accompanying drawings. However, those of ordinary skill in the art can understand that many technical details have been put forward in all the embodiments of the disclosure such that readers can better understand the disclosure. However, even without these technical details and various changes and modifications based on the following embodiments, technical solutions to be protected by the disclosure can be implemented. All the following embodiments are divided for convenience of description, and should not constitute any limitation on specific embodiments of the disclosure. All the embodiments can be combined with each other and cited without contradiction.

An embodiment of the disclosure relates to a reconfigurable optical add-drop multiplexer (ROADM) system. The ROADM system includes: a network management server and a plurality of optical fiber connection units connected to the network management server.

Figure 1:
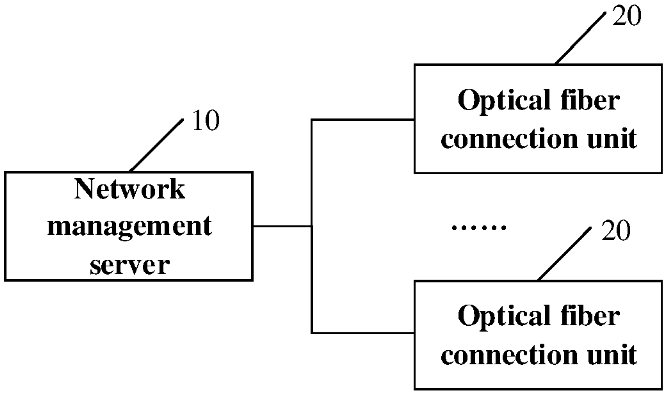
FIG. 1 is a schematic structural diagram of a reconfigurable optical add-drop multiplexer (ROADM) system according to an embodiment of the disclosure.

FIG. 1 is a schematic structural diagram of the ROADM system according to the embodiment. The ROADM system includes: a network management server 10 and a plurality of optical fiber connection units 20. The network management server 10 is connected to each of the optical fiber connection units 20, such that each of the optical fiber connection units 20 is controlled.

Figure 2:
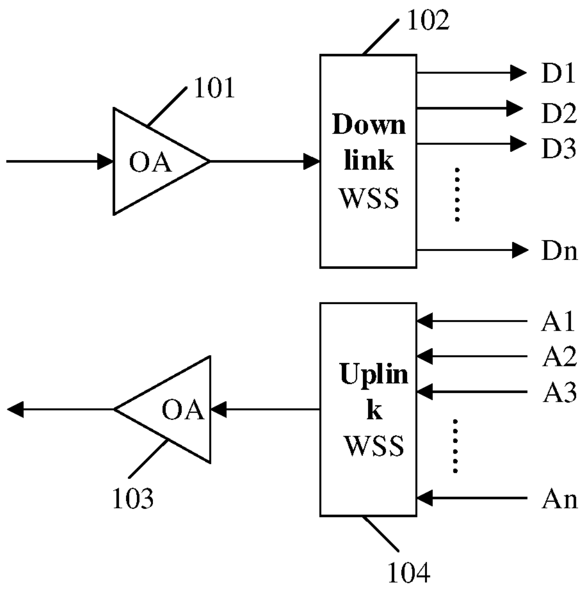
FIG. 2 is a schematic structural diagram of an optical fiber connection unit in an ROADM system according to an embodiment of the disclosure.

FIG. 2 is a schematic structural diagram of an optical fiber connection unit in an ROADM system according to the embodiment. The optical fiber connection unit includes: a downlink optical amplifier 101, a downlink wavelength selective switch (WSS) 102, an uplink optical amplifier 103, and an uplink WSS 104.

Specifically, an output end of the downlink optical amplifier 101 is connected to an input end of the downlink WSS 102, and the downlink WSS 102 includes n transmission ports D1-Dn. An input end of the uplink optical amplifier 103 is connected to an output end of the uplink WSS 104, and the uplink WSS 104 includes n reception ports A1-An. One of the transmission ports (i.e., any one of the ports D1-Dn) of the downlink WSS 102 is configured to be connected to one of the reception ports of the uplink WSS of another optical fiber connection unit. One of the reception ports (i.e., any one of the ports A1-An) of the uplink WSS 104 is configured to be connected to one of the transmission ports of the downlink WSS of another optical fiber connection unit.

Specifically, the downlink optical amplifier 101 may provide an optical signal, that is, a broad-spectrum optical signal, at the start of a project. In this case, no service optical signal is transmitted, and the network management server may obtain first optical power of the output end of the downlink optical amplifier 101 and second optical power of the input end of the uplink optical amplifier 103, where the downlink optical amplifier and the uplink optical amplifier are connected to the same optical fiber, such that an insertion loss value of the optical fiber is obtained, and the optical fiber is tested.

Specifically, a function of the downlink optical amplifier 101 in the ROADM system is to amplify a service signal transmitted by a last node. Meanwhile, in this embodiment, the downlink optical amplifier 101 further needs to provide a broad-spectrum optical signal in a case where no service optical signal is input (that is, in the case of start of the project), and the network management server may inquire optical power of the output end of the downlink optical amplifier 101. A function of the uplink optical amplifier 103 in the ROADM system is to amplify a service signal transmitted by a last node. In addition, in this embodiment, since an uplink where the uplink optical amplifier 103 is located may be connected to a downlink of another optical fiber connection unit, a broad-spectrum optical signal may be transmitted to the uplink optical amplifier 103, such that the network management server needs to inquire optical power of the input end of the uplink optical amplifier 103.

Specifically, the downlink WSS 102 may turn on or off service transmission ports D1-Dn according to a service operation instruction provided by the network management server, and the uplink WSS 104 may turn on or off service reception ports A1-An according to a service operation instruction provided by the network management server.

Specifically, a plurality of optical fiber connection units are provided in the ROADM system of this embodiment. The n transmission ports and the n reception ports of each of the optical fiber connection units are arranged in a one-to-one correspondence manner. The n transmission ports of each of the optical fiber connection units are respectively connected to one reception ports of the n optical fiber connection units, and the n reception ports of each of the optical fiber connection units are respectively connected to one transmission ports of the n optical fiber connection units. One of the transmission ports of one of the optical fiber connection units is connected to one of the reception ports of another optical fiber connection unit, and the reception port of one of the optical fiber connection units corresponding to one of the transmission ports is connected to the transmission port of another optical fiber connection unit corresponding to one of the reception ports.

Figure 3:
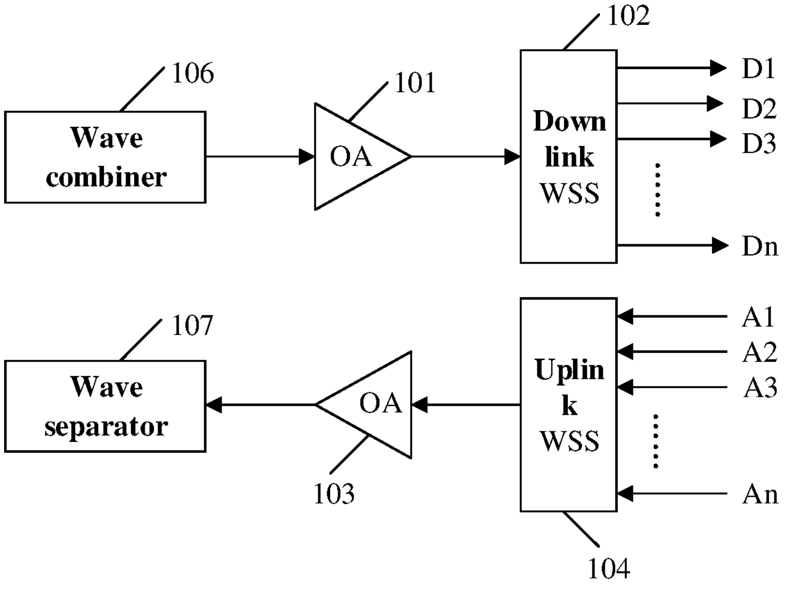
FIG. 3 is a schematic structural diagram of a local uplink and downlink unit according to an embodiment of the disclosure.

In an embodiment, one of the optical fiber connection units further includes a wave combiner 106 and a wave separator 107. The optical fiber connection unit is a local uplink and downlink unit. FIG. 3 is a schematic structural diagram of a local uplink and downlink unit. As shown in FIG. 3, an output end of the wave combiner 106 is connected to an input end of the corresponding downlink optical amplifier 101, and an input end of the wave combiner 106 is connected to a local user. An input end of the wave separator 107 is connected to an output end of the corresponding uplink optical amplifier 103, and an output end of the wave separator 106 is connected to the local user. Specifically, local service signals are combined by the wave combiner 106, amplified by the downlink optical amplifier 101, and then transmitted to the respective service reception ports A1-An of an uplink WSS 104 of a next node by the service transmission ports D1-Dn of the downlink WSS 102. Similarly, service signals from directions are transmitted to the respective service reception ports A1-An of the uplink WSS 104 of the local uplink and downlink unit by the service transmission ports D1-Dn of the respective downlink WSSs 102 in the directions, amplified by the uplink optical amplifier 103, and then separated by the wave separator 107 and transmitted to the local user.

For convenience of description, the embodiment conducts illustration with the number of optical fiber connection units being 5 as an instance, which does not limit the solution.

Figure 4:
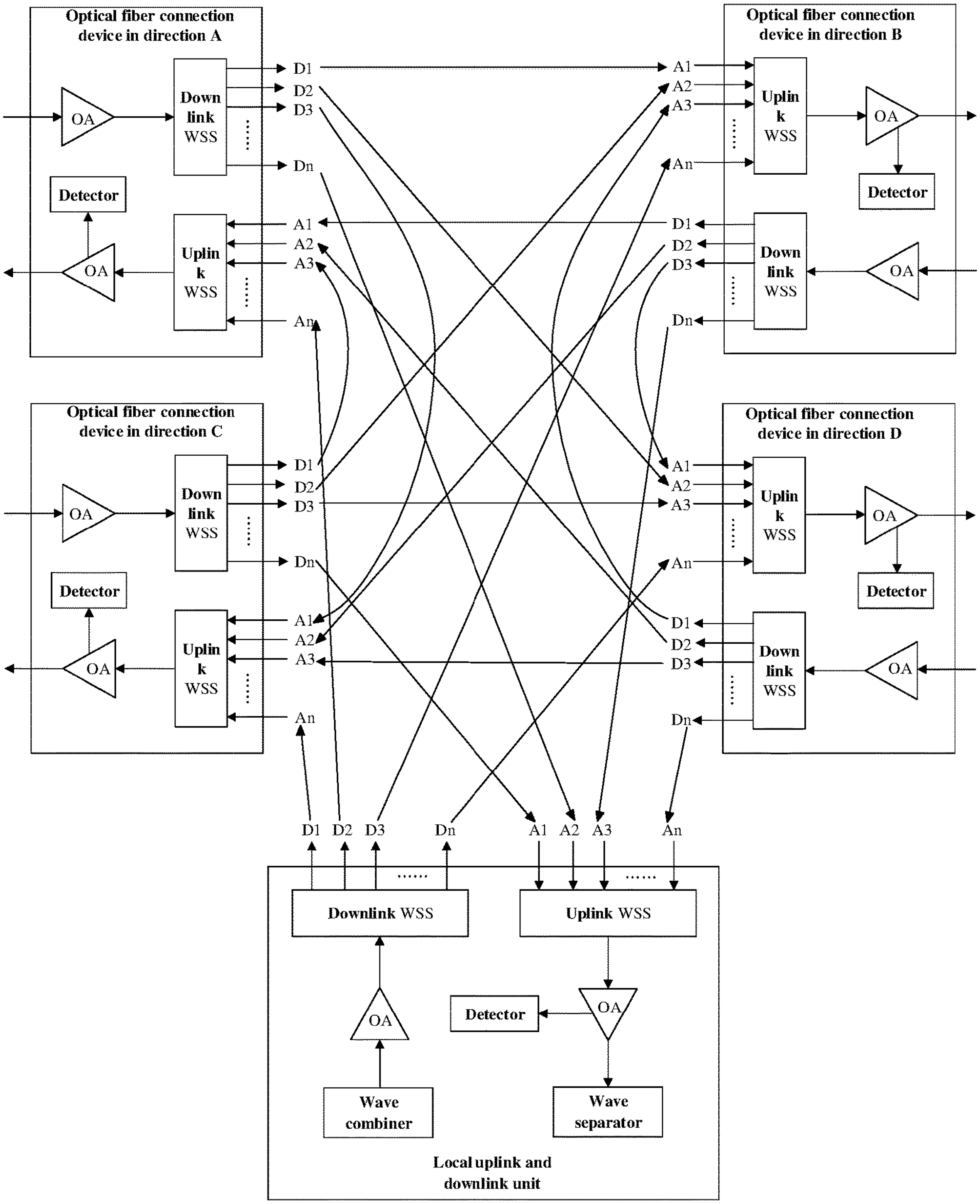
FIG. 4 is a schematic structural diagram of an ROADM system according to an embodiment of the disclosure.

FIG. 4 is a schematic structural diagram of an ROADM system of the embodiment. The ROADM system includes optical fiber connection units in four directions, that is, an optical fiber connection unit in direction A, an optical fiber connection unit in direction B, an optical fiber connection unit in direction C, an optical fiber connection unit in direction D; and a local uplink and downlink unit. The local uplink and downlink unit is also an optical fiber connection unit. In FIG. 4, solid lines having arrows represent physical optical fibers, and the arrows indicate directions of optical signals. There are 20 optical fibers connected to each other in total in FIG. 4. A service transmission port D1 of a downlink WSS of an optical fiber connection unit in direction A is connected to a service reception port A1 of an uplink WSS of an optical fiber connection unit in direction B, a service transmission port D2 of a downlink WSS of an optical fiber connection unit in direction A is connected to a service reception port A2 of an uplink WSS of an optical fiber connection unit in direction D, a service transmission port D3 of a downlink WSS of an optical fiber connection unit in the direction A is connected to a service reception port A1 of an uplink WSS of an optical fiber connection unit in direction C, and a service transmission port Dn of the downlink WSS of the optical fiber connection unit in the direction A is connected to a service reception port A2 of an uplink WSS of a local uplink and downlink unit. Accordingly, a service transmission port A1 of an uplink WSS of the optical fiber connection unit in the direction A is connected to a service reception port D1 of a downlink WSS of the optical fiber connection unit in the direction B, a service transmission port A2 of the uplink WSS of the optical fiber connection unit in the direction A is connected to a service reception port D2 of a downlink WSS of the optical fiber connection unit in the direction D, a service transmission port A3 of an uplink WSS of the optical fiber connection unit in the direction A is connected to a service reception port D1 of a downlink WSS of the optical fiber connection unit in the direction C, and a service transmission port An of the uplink WSS of the optical fiber connection unit in the direction A is connected to a service reception port D2 of a downlink WSS of the local uplink and downlink unit. Other physical optical fiber connection relations will not be repeated herein. That is, one transmission port of each of the optical fiber connection units is connected to one reception port of another optical fiber connection unit, and a reception port corresponding to the transmission port is connected to a transmission port of another optical fiber connection unit corresponding to the reception port.

It should be noted that in the embodiment, a tester determines a transmission path of service among the network elements in the ROADM node according to a service fiber connection plan provided by an operator or a device supplier, and then connects the network elements by physical optical fibers according to the service fiber connection plan. For instance, the service fiber connection plan provided by the device supplier is shown in FIG. 4. The tester needs to connect the optical fiber connection units together according to FIG. 4.

Specifically, the tester connects the network elements by the physical optical fibers according to the service fiber connection plan, and then processes the service fiber connection plan with software. A process of processing the service fiber connection plan with software is as follows: firstly, a data model recognizable by a network management server is constructed according to the service fiber connection plan; then, a hierarchical relation between data objects in the data model corresponds to the physical fiber connection relation between the network elements in a one-to-one correspondence manner; and finally, according to the hierarchical relation between the data objects, an execution command recognizable by the network management server is generated, and the network management server executes the corresponding service operation after receiving the execution command. Through the above operations, the tester may construct the data model recognizable by the network management server based on the service fiber connection plan, and transmit the execution command to the network management server. The network management server executes the corresponding service operation according to the execution command, for example, turning on or off a specific transmission port or reception port in a specific WSS in a specific direction. In this way, manpower and time cost are reduced.

Figure 5:
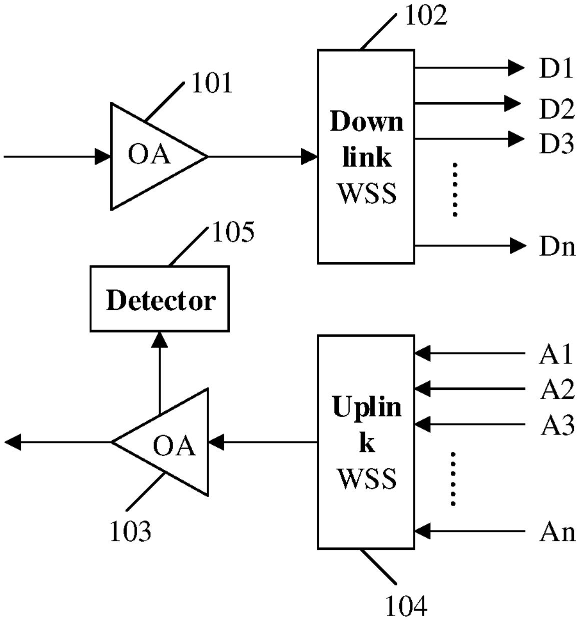
FIG. 5 is a schematic structural diagram of an optical fiber connection unit in an ROADM system according to an embodiment of the disclosure.

In an embodiment, each of the optical fiber connection units of the RODM system further includes a detector. FIG. 5 is a schematic structural diagram of an optical fiber connection unit in the ROADM system of the embodiment. The detector is connected to an uplink optical amplifier 103, specifically to an MON port of the uplink optical amplifier 103. The detector is configured to detect on-off time of an optical signal in the uplink optical amplifier 103.

Specifically, in a downlink optical amplifier 101 and the uplink optical amplifier 103 that are connected to the same optical fiber, the downlink optical amplifier 101 may generate an optical signal and transmit the optical signal to the corresponding uplink optical amplifier 103 by the optical fiber. The detector 105 of the embodiment may detect actual on-off time of the optical signal in the uplink optical amplifier 103, such that start time of a corresponding optical fiber link is obtained. A network management server may determine whether the corresponding optical fiber link has an abnormal connection problem according to the start time. Therefore, the optical fiber connection unit of the embodiment provides a structural basis, which may achieve automatic detection of the optical fiber connection unit.

Figure 6:
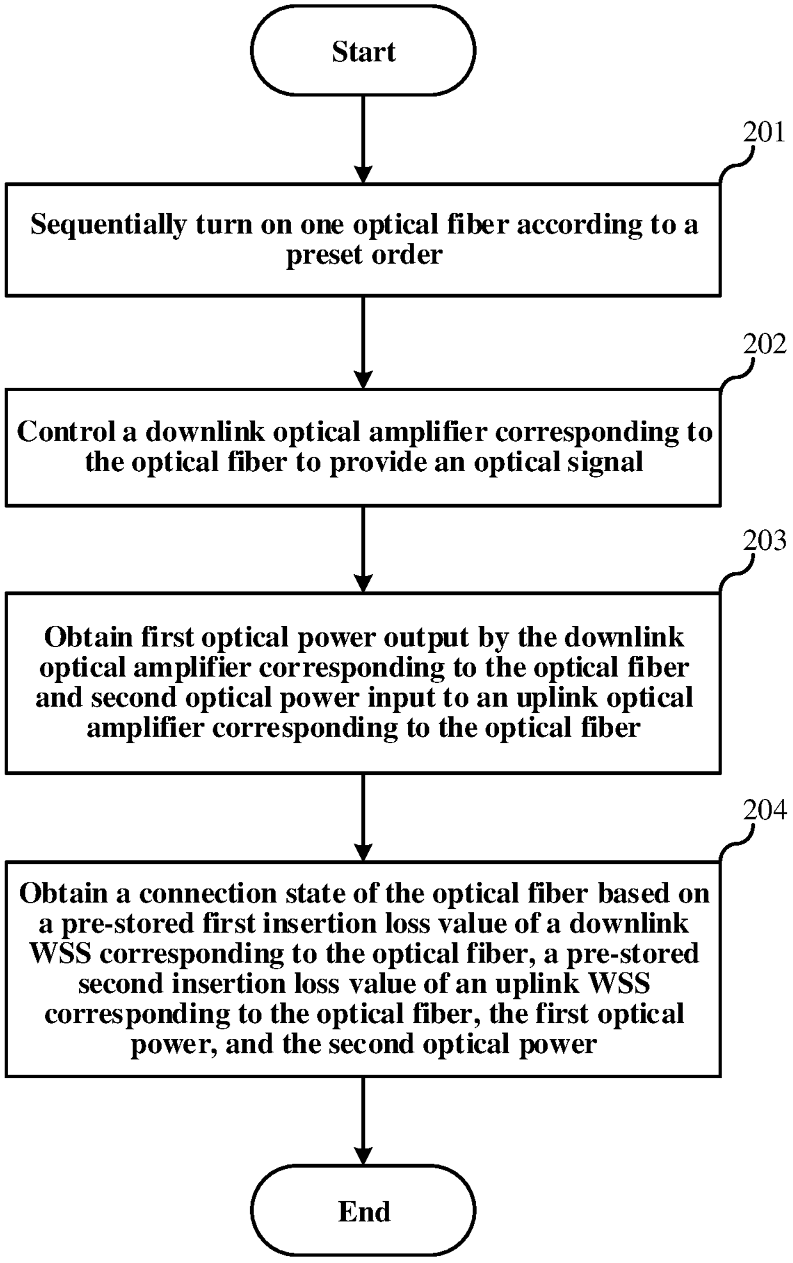
FIG. 6 is a schematic flow diagram of an optical fiber detection method according to an embodiment of the disclosure.

An embodiment of the disclosure relates to an optical fiber detection method, which is applied to the network management server of the ROADM system of the last embodiment. A specific schematic flow diagram of the optical fiber detection method of the embodiment is shown in FIG. 6. The method includes the following operations:

Operation 201, one optical fiber is sequentially turned on according to a preset order.

Specifically, a tester determines a transmission path of service among network elements in an ROADM node according to a service fiber connection plan provided by an operator or a device supplier, and then connects the network elements by physical optical fibers according to the service fiber connection plan. Then, service light is not turned on, and at the start of a project, each optical fiber needs to be tested, such that whether the optical fiber is connected abnormally is determined. Therefore, one optical fiber needs to be sequentially turned on, and only one optical fiber is turned on each time.

Specifically, in a process of turning on one optical fiber, a target transmission port corresponding to the optical fiber and a target reception port corresponding to the optical fiber are controlled to be turned on, and the transmission ports other than the target transmission port in the ROADM system and the reception ports other than the target reception port in the ROADM system are turned off. Since only one optical fiber is turned on each time, only the transmission port and the reception port that are connected to the optical fiber are turned on, and the other transmission ports and reception ports of the ROADM system are all turned off.

Figure 7:
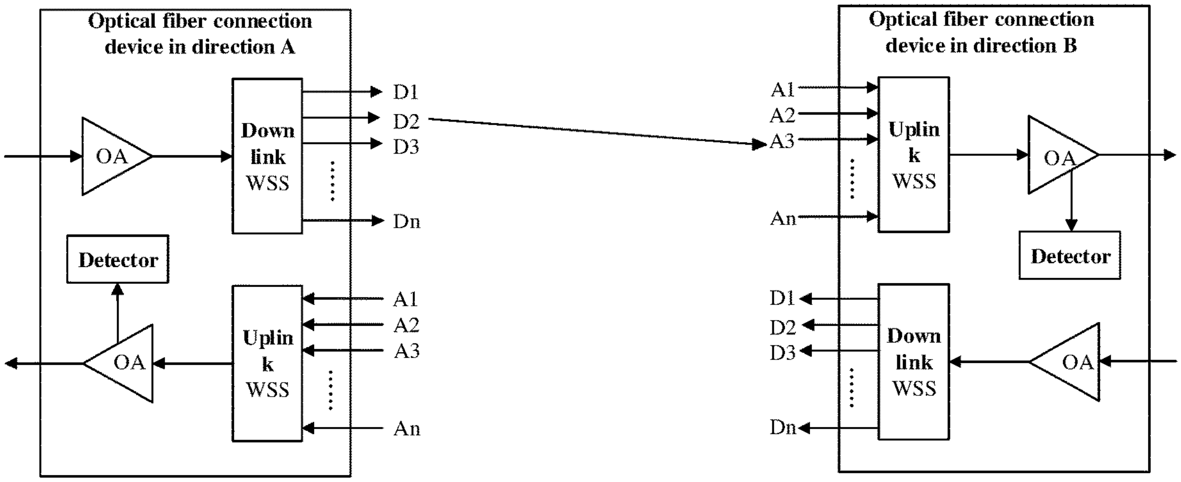
FIG. 7 is a schematic diagram of a local structure of an ROADM system according to an embodiment of the disclosure.

FIG. 7 is a schematic diagram of a local structure of an ROADM system. With the optical fiber shown in FIG. 7 as an instance, when the optical fiber is turned on, a transmission port D2 of a downlink WSS of an optical fiber connection unit in direction A and a reception port A3 of an uplink WSS of an optical fiber connection unit in direction B need to be turned on, transmission ports D1 and D3-Dn of the downlink WSS of the optical fiber connection unit in the direction A need to be turned off, all service reception ports A1-An of an uplink WSS of the optical fiber connection unit in the direction A need to be turned off, all service reception ports other than the service reception port A3 of the uplink WSS of the optical fiber connection unit in the direction B need to be turned off, and all service transmission ports D1-Dn of a downlink WSS of the optical fiber connection unit in the direction B need to be turned off.

Operation 202, a downlink optical amplifier corresponding to the optical fiber is controlled to provide an optical signal.

Operation 203, first optical power output by the downlink optical amplifier corresponding to the optical fiber and second optical power input to an uplink optical amplifier corresponding to the optical fiber are obtained.

Specifically, with FIG. 7 as an instance, a service optical signal is not turned on, and at the start of a project, the downlink optical amplifier in the direction A may provide the optical signal under the control of the network management server, and broad-spectrum optical signals may be transmitted to the downlink WSS in the direction A, the transmission port D2, the reception port A3 and the uplink WSS in the direction B, respectively. The network management server may obtain the first optical power output by the downlink optical amplifier connected to the optical fiber and the second optical power input to the uplink optical amplifier connected to the optical fiber separately.

Referring back to FIG. 6, operation 204, a connection state of the optical fiber is obtained based on a pre-stored first insertion loss value of a downlink WSS corresponding to the optical fiber, a pre-stored second insertion loss value of an uplink WSS corresponding to the optical fiber, the first optical power, and the second optical power.

Specifically, each downlink WSS and each uplink WSS both have insertion loss, and insertion loss value information of the downlink WSS and insertion loss value information of the uplink WSS are both marked in respective WSS single plates. Before testing, the network management server obtains and stores the insertion loss value information of the downlink WSS and the insertion loss value information of the uplink WSS. During testing, the connection state of the optical fiber is obtained based on the pre-stored first insertion loss value of the downlink WSS corresponding to the optical fiber, the pre-stored second insertion loss value of the uplink WSS corresponding to the optical fiber, the first optical power, and the second optical power.

Figure 8:
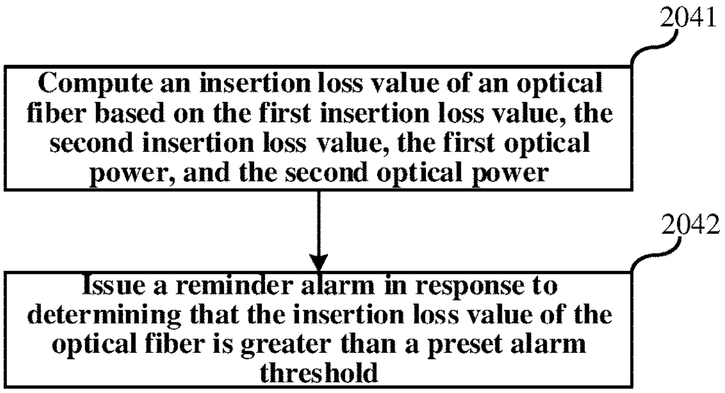
FIG. 8 is a schematic flow diagram of sub-operations of operation 204 of an optical fiber detection method according to an embodiment of the disclosure.

In an embodiment, FIG. 8 is a schematic flow diagram of sub-operations of operation 204. The operation that the connection state of the optical fiber is obtained based on the first insertion loss value, the second insertion loss value, the first optical power, and the second optical power includes the following sub-operations:

Operation 2041, an insertion loss value of the optical fiber is computed based on the first insertion loss value, the second insertion loss value, the first optical power, and the second optical power.

Specifically, the insertion loss value of the optical fiber is computed based on the first insertion loss value, the second insertion loss value, the first optical power, and the second optical power as follows: the second optical power is subtracted from the first optical power, and a total insertion loss value is obtained; and the first insertion loss value and the second insertion loss value are subtracted from the total insertion loss value, and the insertion loss value of the optical fiber is obtained. That is, the insertion loss value of the optical fiber=(the first optical power−the second optical power)−the first insertion loss value−the second insertion loss value. The insertion loss value of the optical fiber may be obtained through the computing method.

Operation 2042, a reminder alarm is issued in response to determining that the insertion loss value of the optical fiber is greater than a preset alarm threshold.

Specifically, the network management server presets an alarm threshold. After the insertion loss value of the optical fiber is obtained, the network management server compares the insertion loss value of the optical fiber with the preset alarm threshold. If the insertion loss value of the optical fiber does not exceed the preset alarm threshold, it is indicated that optical fiber connection is error-free. If the insertion loss value of the optical fiber exceeds the preset alarm threshold, the network management server generates a reminder alarm, so as to remind a tester of a physical optical fiber connection problem of the service transmission path. After receiving the reminder alarm generated by the network management server, the tester checks the physical optical fiber connection on the service transmission path, and starts to re-test insertion loss of the optical fiber after checking.

According to the embodiment, optical power information of the input end of the downlink optical amplifier and optical power information of the output end of the uplink optical amplifier are inquired. A connection insertion loss value of a corresponding physical optical fiber may be computed according to the above information, such that whether the physical optical fiber is abnormal is detected. In an entire testing process, the network management server only needs to sequentially turn on corresponding optical fibers according to the preset order, and the tester does not need to manually conduct testing through test instruments site by site, such that a lot of manpower, material resources and time cost are reduced, interference of human factors in test results is basically avoided, and reliability is greatly improved.

The embodiment is suitable for scenes having smaller sites, fewer direction dimensions and fewer physical fibers, for instance, the number of physical optical fibers is less than 100. In this case, the optical fiber detection method of the embodiment is high in detection accuracy, such that the insertion loss information of the optical fiber may be accurately detected, and whether the optical fiber are wrongly connected, broken or excessively bent is determined.

An embodiment of the disclosure relates to an optical fiber detection method, which is applied to the network management server of the ROADM system of the above embodiment. Each of optical fiber connection units further includes a detector. The detector is connected to an uplink optical amplifier, and the detector is configured to detect on-off time of an optical signal in the uplink optical amplifier.

Figure 9:
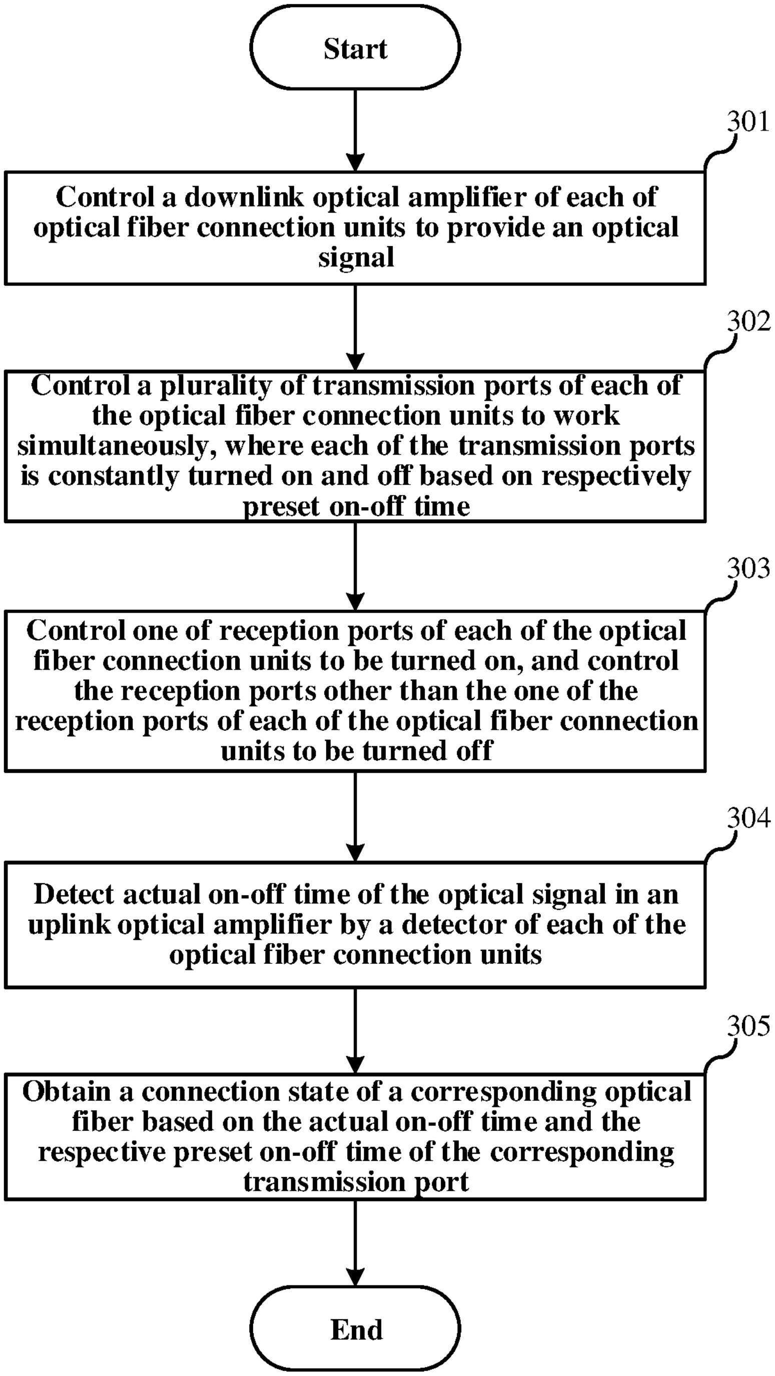
FIG. 9 is a schematic flow diagram of an optical fiber detection method according to an embodiment of the disclosure.

A specific schematic flow diagram of the embodiment is shown in FIG. 9. The method includes the following operations:

Operation 301, a downlink optical amplifier of each of the optical fiber connection units is controlled to provide an optical signal.

Operation 302, a plurality of transmission ports of each of the optical fiber connection units are controlled to work simultaneously, where each of the transmission ports is constantly turned on and off based on respective preset on-off time of the transmission port.

Specifically, with reference to FIG. 4, the network management server may simultaneously control each of the transmission ports of the optical fiber connection unit in each direction in the embodiment. For instance, all the transmission ports D1-Dn of all downlink WSSs of the optical fiber connection units in directions A, B, C and D and a local uplink and downlink unit are controlled to be simultaneously turned on. An operation of "turning on-turning off-turning on-turning off" is conducted on each of the transmission ports, and an on-off state of the transmission port is constantly switched. Each of the transmission ports is configured with preset on-off time, and on-off time of each of the transmission ports corresponds to the preset on-off time.

Operation 303, one of reception ports of each of the optical fiber connection units is controlled to be turned on, and the reception ports other than the one of the reception ports of each of the optical fiber connection units are controlled to be turned off.

Specifically, for each of the optical fiber connection units, one of the reception ports is controlled to be turned on, and the other reception ports are controlled to be turned off. For instance, with reference to FIG. 4, a reception port A1 of the uplink WSS of each of the optical fiber connection units is turned on, and the other reception ports A2-An are turned off. Optical signals of 5 reception ports A1 enter the corresponding 5 uplink optical amplifiers, respectively, and the detector may detect actual on-off time of the optical signals.

In an instance, after the actual on-off time of the optical signal in the uplink optical amplifier is detected by the detector of each of the optical fiber connection units, another reception port of each of the optical fiber connection units is controlled to be turned on according to a preset order. Specifically, with reference to FIG. 4, the reception port A1 of the uplink WSS of each of the optical fiber connection units is turned on, and the other reception ports A2-An are turned off. The optical signals of the 5 reception ports A1 enter the corresponding 5 uplink optical amplifiers, respectively, and the detector may detect actual on-off time of the optical signals in the uplink optical amplifiers. In this case, only part of optical fiber links are detected. In order to detect each of the optical fiber links, another reception port of the uplink WSS of each of the optical fiber connection units is turned on under execution of operation 302. That is, after detection is completed, the 5 reception ports A1 are turned off, 5 reception ports A2 are turned on for detection, and the above operation is repeated until all reception ports An are detected. In this way, detection of each optical fiber may be quickly implemented.

Operation 304, actual on-off time of the optical signal in an uplink optical amplifier is detected by a detector of each of the optical fiber connection units.

Operation 305, a connection state of a corresponding optical fiber is obtained based on the actual on-off time and the respective preset on-off time of the corresponding transmission port.

Specifically, in the optical fiber connection unit, the detector is configured to detect the actual on-off time of the optical signal in the corresponding uplink optical amplifier. Each of the transmission ports is configured with preset on-off time, and each of the transmission ports executes an operation of "turning on-turning off-turning on-turning off" according to the preset on-off time. Therefore, if the optical fiber is not connected abnormally, a difference value between the actual on-off time and the preset on-off time should not be large, and the connection state of the corresponding optical fiber may be obtained based on the actual on-off time and the preset on-off time. The optical fiber is connected to the reception port and the transmission port corresponding to the reception port.

With reference to FIG. 4, the network management server compares the on-off time of the optical signals detected by the detectors of uplinks of the optical fiber connection units in the directions A, B, C and D and the local uplink and downlink unit with the set on-off time of service transmission ports corresponding to the downlink WSSs of the optical fiber connection units in the directions A, B, C and D and the local uplink and downlink unit, to determine whether fiber connection between the corresponding ports is correct. For instance, A1 of the uplink WSS of the optical fiber connection unit in the direction A is connected to D1 of the downlink WSS of the optical fiber connection unit in the direction B, and the on-off time of the optical signal detected by the detector of the uplink of the optical fiber connection unit in the direction A is compared with the set on-off time of the optical signal of the transmission port D1 of the downlink WSS of the optical fiber connection unit in the direction B. If a difference value between the above two on-off time is within an error range, it is indicated that physical optical fiber connection between the transmission port D1 of the downlink WSS of the optical fiber connection unit in the direction B and the reception port A1 of the uplink WSS of the optical fiber connection unit in the direction A is correct. Otherwise, the optical fiber connection is wrong.

In an instance, the operation that the connection state of the corresponding optical fiber is obtained based on the actual on-off time and the respective preset on-off time of the transmission port includes the following operations: a difference value between the actual on-off time and the preset on-off time is computed; and a reminder alarm is issued in response to determining that the difference value is not within a preset range. Specifically, if the difference value is within the preset range, it is indicated that the optical fiber connection is error-free. If the difference value is beyond the preset range, the network management server generates a reminder alarm, so as to remind a tester of a physical optical fiber connection problem of the service transmission path. After receiving the reminder alarm generated by the network management server, the tester checks the physical optical fiber connection on the service transmission path, and starts to re-test the optical fiber after checking.

With FIG. 4 as an instance, the network management server determines the on-off time of the transmission ports D1-Dn of the downlink WSSs of the optical fiber connection units in the directions A, B, C and D and the local uplink and downlink unit according to the service fiber connection plan as shown in FIG. 4, and the on-off time of each of the transmission ports is unique. In this way, detection accuracy is improved, and the situation that two on-off time are set to be the same, and a connection error is caused, resulting in failure in detection is avoided. For instance, the on-off time of the service transmission port D1 of the downlink WSS of the optical fiber connection unit in the direction A may be set to be 10 ms, the on-off time of the service transmission port D2 of the downlink WSS of the optical fiber connection unit in the direction A may be set to be 20 ms, the on-off time of the service transmission port D3 of the downlink WSS of the optical fiber connection unit in the direction A may be set to be 30 ms, and the above operation is repeated until setting of the on-off time of all the transmission ports of the downlink WSSs in all the directions is completed.

In the embodiment, all the transmission ports of the optical fiber connection units are simultaneously turned on, one reception port of each of the optical fiber connection units is controlled to be turned on according to a preset order, and the reception ports other than the one of the reception ports of each the optical fiber connection units are controlled to be turned off, such that the actual on-off time of the corresponding optical fiber is obtained, and whether the physical optical fiber is abnormal may be quickly detected by comparing the actual on-off time with the corresponding preset on-off time. In an entire testing process, the network management server needs to perform an operation of "turning on-turning off-turning on-turning off" on all the transmission ports in all the directions according to the preset on-off time. In addition, the network management server further needs to sequentially turn on the reception ports in all the directions according to an order of A1-An, and the tester does not need to manually perform testing through test instruments site by site, such that a lot of manpower, material resources and time cost are reduced, interference of human factors in test results is basically avoided, and reliability is greatly improved.

The embodiment is suitable for a scene having larger sites, more direction dimensions, and more and complicated physical optical fibers. For instance, the number of physical optical fibers reaches 300 or more. In the scene, whether there is an optical fiber wrongly connected in a plurality of optical fibers needs to be determined in a short time. In this case, the optical fiber detection method of the embodiment is used, which is high in detection efficiency and low in time consumption.

The operations of all the above methods are divided for convenience of description, and may be combined into one operation or divided into a plurality of operations during implementation, which fall within the protection scope of the patent as long as they include the same logical relation. Any changes through addition of insignificant modification or introduction of insignificant design to the algorithm or process shall fall within the protection scope of the patent if they do not change the core design of the algorithm and process.

Figure 10:
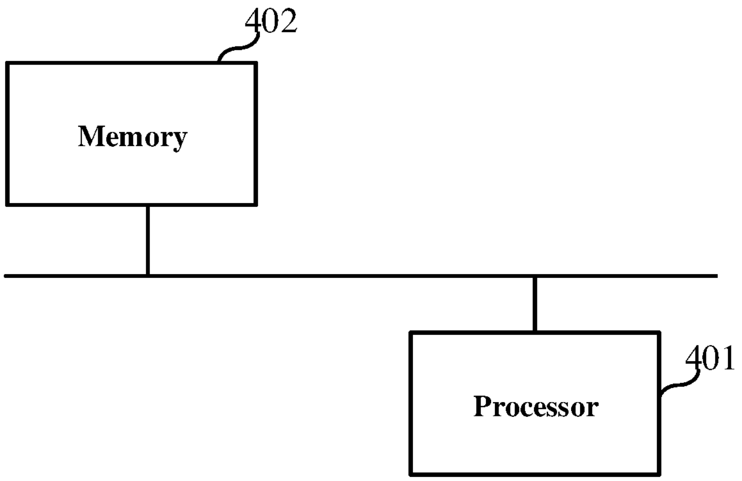
FIG. 10 is a schematic structural diagram of a server according to an embodiment of the disclosure.

An embodiment of the disclosure relates to a server. As shown in FIG. 10, the server includes at least one processor 401; and a memory 402 communicatively connected to the at least one processor 401. The memory 402 stores an instruction executable by the at least one processor 301. The instruction, when executed by the at least one processor 401, enables the at least one processor 401 to execute the optical fiber detection method mentioned above.

The memory 402 and the processor 401 are connected by a bus. The bus may include any number of interconnected bus bodies and bridges. The bus connects various circuits of one or more processors 401 and the memory 402 together. The bus may further connect various other circuits, such as peripheral device, voltage regulator and power management circuits, which are well known in the art, so they will not be further described herein. A bus interface provides an interface between the bus and a transceiver. The transceiver may be one or more elements, such as a plurality of receivers and transmitters, which provides a unit for communication with various other apparatuses on a transmission medium. Data processed by the processor 401 is transmitted on a wireless medium by an antenna. Further, the antenna receives the data and transmits the data to the processor 401.

The processor 401 is responsible for managing the bus and general processing, and may further provide various functions, including timing, peripheral interface, voltage regulation, power management, and other control functions. The memory 402 may be configured to store data used by the processor 401 during operation execution.

An embodiment of the disclosure relates to a computer readable storage medium, which stores a computer program. The computer program, when executed by a processor, implements the method embodiment.

That is, those skilled in the art may understand that all or part of the operations in the method of the above embodiments may be completed by instructing related hardware with a program, which is stored in a storage medium and includes several instructions to enable a device (which may be a single chip microcomputer, a chip, etc.) or a processor to execute all or part of the operations of the methods of all the embodiments of the disclosure. The above storage medium includes: a USB flash disk, a mobile hard disk, a read only memory (ROM), a random access memory (RAM), a magnetic disk, an optical disk and other media capable of storing program codes.

Those of ordinary skill in the art may understand that all the above embodiments are specific embodiments for implementing the disclosure. In practical application, various changes may be made in form and detail without departing from the spirit and scope of the disclosure.

The invention claimed is:

1. An optical fiber detection method, applied to a reconfigurable optical add-drop multiplexer (ROADM) system, wherein the ROADM system comprises: a network management server and a plurality of optical fiber connection units connected to the network management server, wherein each of the plurality of optical fiber connection units comprises: a downlink optical amplifier, a downlink wavelength selective switch (WSS), an uplink optical amplifier, and an uplink WSS, and the plurality of optical fiber connection units are connected with each other by optical fibers, wherein the method comprises, at the network management server:

controlling a corresponding downlink optical amplifier in a first optical fiber connection unit connected to an optical fiber to-be-detected to provide an optical signal, the optical fiber to-be-detected being turned on, while other optical fibers being turned off;

obtaining first optical power output by the corresponding downlink optical amplifier and second optical power input to a corresponding uplink optical amplifier in a second optical fiber unit connected to the optical fiber to-be-detected; and obtaining a connection state of the optical fiber to-be-detected based on the first optical power and the second optical power.

2. The optical fiber detection method according to claim 1, wherein obtaining the connection state of the optical fiber to-be-detected based on the first optical power and the second optical power comprises:

obtaining the connection state of the optical fiber to-be-detected based on a pre-stored first insertion loss value of the downlink WSS in the first optical fiber connection unit, a pre-stored second insertion loss value of the uplink WSS in the second optical fiber connection unit, the first optical power, and the second optical power.

3. The optical fiber detection method according to claim 2, wherein obtaining the connection state of the optical fiber to-be-detected based on the first insertion loss value, the second insertion loss value, the first optical power, and the second optical power comprises:

computing an insertion loss value of the optical fiber to-be-detected based on the first insertion loss value, the second insertion loss value, the first optical power, and the second optical power; and issuing a reminder alarm in response to determining that the insertion loss value of the optical fiber to-be-detected is greater than a preset alarm threshold.

4. The optical fiber detection method according to claim 3, wherein computing the insertion loss value of the optical fiber to-be-detected based on the first insertion loss value, the second insertion loss value, the first optical power, and the second optical power comprises:

subtracting the second optical power from the first optical power, and obtaining a total insertion loss value; and subtracting the first insertion loss value and the second insertion loss value from the total insertion loss value, and obtaining the insertion loss value of the optical fiber to-be-detected.

5. The optical fiber detection method according to claim 1, further comprising:

controlling a target transmission port corresponding to the optical fiber to-be-detected and a target reception port corresponding to the optical fiber to-be-detected to be turned on.

6. The optical fiber detection method according to claim 1, further comprising: turning off the transmission ports other than a target transmission port in the ROADM system and the reception ports other than a target reception port in the ROADM system.

7. The optical fiber detection method according to claim 1, further comprising:

detecting each optical fiber of the ROADM system, wherein one optical fiber is sequentially turned on according to a preset order.

8. The optical fiber detection method according to claim 1, wherein each optical fiber connection unit is connected to other optical fiber connection units by a transmission port of the uplink WSS and a reception port of the downlink WSS therein.

9. The optical fiber detection method according to claim 1, wherein an output end of the downlink optical amplifier in each optical fiber connection unit is connected to an input port of the downlink WSS therein, and the downlink WSS comprises n transmission ports; an input end of the uplink optical amplifier in each optical fiber connection unit is connected to an output port of the uplink WSS therein, and the uplink WSS comprises n reception ports;

wherein the n transmission ports of each optical fiber connection unit are respectively connected to corresponding reception ports of other optical fiber connection units by optical fibers in a one-to-one correspondence manner, and the n reception ports of each optical fiber connection unit are respectively connected to corresponding transmission ports of the other optical fiber connection units by optical fibers in a one-to-one correspondence manner;

wherein one transmission port of the n transmission ports of each optical fiber connection unit is connected to one corresponding reception port of the n reception ports of another one optical fiber connection unit, and a reception port of the n reception ports of each optical fiber connection unit corresponding to the one transmission port of the n transmission ports of each optical fiber connection unit is connected to a transmission port of the n reception ports of the another one optical fiber connection unit corresponding to the one corresponding reception port of the n reception ports of the another one optical fiber connection unit.

10. A network management server applied to a reconfigurable optical add-drop multiplexer (ROADM) system, wherein the ROADM system comprises: the network management server and a plurality of optical fiber connection units connected to the network management server, wherein each of the plurality of optical fiber connection units comprises: a downlink optical amplifier, a downlink wavelength selective switch (WSS), an uplink optical amplifier, and an uplink WSS, and the plurality of optical fiber connection units are connected with each other by optical fibers, wherein the network management server comprises:

at least one processor, and a memory communicatively connected to the at least one processor; wherein the memory stores instructions executable by the at least one processor, the instructions, when executed by the at least one processor, cause the at least one processor to:

control a corresponding downlink optical amplifier in a first optical fiber connection unit connected to an optical fiber to-be-detected to provide an optical signal, the optical fiber to-be-detected being turned on, while other optical fibers being turned off;

obtain first optical power output by the corresponding downlink optical amplifier and second optical power input to a corresponding uplink optical amplifier in a second optical fiber connection unit connected to the optical fiber to-be-detected; and obtain a connection state of the optical fiber to-be-detected based on the first optical power, and the second optical power.

11. The network management server according to claim 10, wherein the at least one processor being caused to obtain the connection state of the optical fiber to-be-detected based on the first optical power, and the second optical power includes being caused to: obtain the connection state of the optical fiber to-be-detected based on the first insertion loss value, the second insertion loss value, the first optical power, and the second optical power.

12. The network management server according to claim 11, wherein the at least one processor being caused to obtain the connection state of the optical fiber to-be-detected based on the first insertion loss value, the second insertion loss value, the first optical power, and the second optical power includes being caused to:

compute an insertion loss value of the optical fiber to-be-detected based on the first insertion loss value, the second insertion loss value, the first optical power, and the second optical power; and issue a reminder alarm in response to determining that the insertion loss value of the optical fiber to-be-detected is greater than a preset alarm threshold.

13. The network management server according to claim 12, wherein the at least one processor being caused to compute the insertion loss value of the optical fiber to-be-detected based on the first insertion loss value, the second insertion loss value, the first optical power, and the second optical power includes being caused to:

subtract the second optical power from the first optical power, and obtain a total insertion loss value; and subtract the first insertion loss value and the second insertion loss value from the total insertion loss value, and obtain the insertion loss value of the optical fiber to-be-detected.

14. A reconfigurable optical add-drop multiplexer (ROADM) system, wherein the ROADM system comprises:

a network management server, and a plurality of optical fiber connection units connected to the network management server, wherein each of the plurality of optical fiber connection units comprises: a downlink optical amplifier, a downlink wavelength selective switch, WSS, an uplink optical amplifier, and an uplink WSS, and the plurality of optical fiber connection units are connected with each other by optical fibers, wherein the network management server comprises:

at least one processor, and a memory communicatively connected to the at least one processor; wherein the memory stores instructions executable by the at least one processor, the instructions, when executed by the at least one processor, cause the at least one processor to:

control a corresponding downlink optical amplifier in a first optical fiber connection unit connected to an optical fiber to-be-detected to provide an optical signal, the optical fiber to-be-detected being turned on, while other optical fibers being turned off;

obtain first optical power output by the corresponding downlink optical amplifier and second optical power input to a corresponding uplink optical amplifier in a second optical fiber connection unit connected to the optical fiber to-be-detected; and obtain a connection state of the optical fiber to-be-detected based on the first optical power, and the second optical power.

* * * * *